(12) United States Patent  
Mathiaparanam

(10) Patent No.: US 7,294,724 B2
(45) Date of Patent: Nov. 13, 2007

(54) PROCESS FOR MANUFACTURE OF FLUORAN DYES

(75) Inventor: Ponnampalam Mathiaparanam, Appleton, WI (US)

(73) Assignee: Appleton Papers Inc., Appleton, WI (US)

( * ) Notice: Subject to any disclaimer, the term of this patent is extended or adjusted under 35 U.S.C. 154(b) by 343 days.

(21) Appl. No.: 11/201,528

(22) Filed: Aug. 11, 2005

(65) Prior Publication Data

US 2007/0037989 A1   Feb. 15, 2007

(51) Int. Cl.
*C07D 307/94* (2006.01)
*C07D 493/10* (2006.01)

(52) U.S. Cl. .................................... 549/265
(58) Field of Classification Search ................ 549/265
See application file for complete search history.

(56) References Cited

U.S. PATENT DOCUMENTS 4,954,631 A   9/1990   Obitsu et al. .............. 546/15

OTHER PUBLICATIONS

New Fluoran Leuco Dyes Having a Phenylenediamine Moiety at the 6-Position of the Xanthene Ring, Dyes and Pigments, vol. 36, No. 1, pp. 15-26, 1998, Mitsuhiro Yanagita, Izuo Aoki and Sumio Tokita.

*Primary Examiner*—Taofiq Solola
(74) *Attorney, Agent, or Firm*—Benjamin Mieliulis

(57) ABSTRACT

The invention teaches an improved process for the manufacture of useful fluoran dyes of the structure according to formula 1

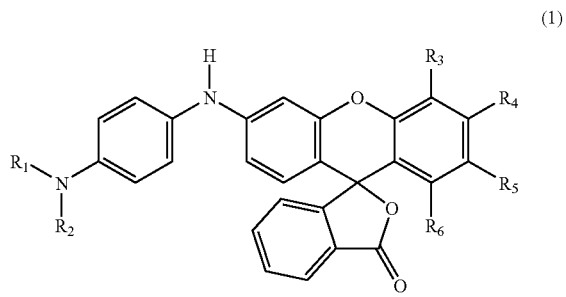

(1)

comprising condensing in an alkanesulfonic acid or an arenesulfonic acid to acid according to formula 2

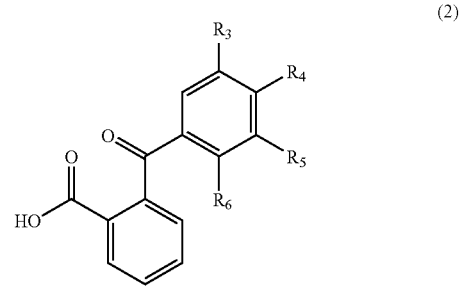

(2)

with an aminodiphenylamine of formula 3

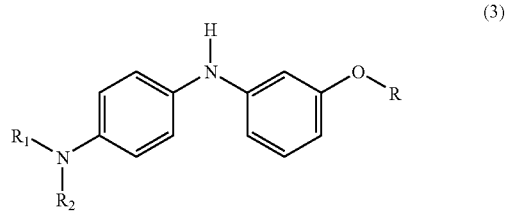

(3)

wherein R, $R_1$-$R_6$ are as defined in the specification.

9 Claims, No Drawings

PROCESS FOR MANUFACTURE OF FLUORAN DYES

BACKGROUND OF THE INVENTION

1. Field of the Invention

This invention relates to fluoran leuco dyes. It more particularly relates to fluoran leuco dyes containing a phenylenediamine moiety and processes for manufacturing such fluoran leuco dyes.

Fluoran leuco dyes containing a phenylenediamine moiety are useful as neutral color formers in applications such as heat sensitive and pressure sensitive recording materials. These normally colorless or light colored dyes express a color form when contacted with acidic or alkaline developers. Advantageously these materials can express a neutral or blackish hue.

2. Description of the Related Art

Fluoran leuco dyes for forming recording materials are described in Obitsu et al. U.S. Pat. Nos. 4,954,631 and 4,826,806.

Obitsu et al. teaches a synthesis involving reacting an aminophenol derivative with a keto acid such as a benzoic acid derivative in the presence of sulfuric acid.

Condensing a keto acid and a diphenylamine in sulfuric acid to produce a fluoran dye containing a phenylenediamine moiety typically results in poor yields. This makes the material costly to manufacture thereby limiting commercial acceptability. As a result, these materials are not believed to have been widely adopted.

The keto acid and diphenylamine condensation in sulfuric acid route to produce the fluoran leuco dyes is susceptible to various side reactions resulting in poor yield of the product.

In U.S. Pat. No. 4,954,631 Obitsu for example illustrates reacting one gram of 2-(5'-chloro-2'-hydroxy-4'-methyl) benzoylbenzoic acid with one gram of 3-methoxy-4'-(4"-phenylamino)phenylamino)diphenylamine and in the end isolating only 0.7 gram of 3-[4'-(4"-phenylaminophenylamino)-phenylamino]-6-methyl-7-chlorofluoran.

It would be desirable and of commercial significance if fluoran leuco dyes containing a phenylenediamine moiety can be made in higher yield with fewer side reactions and fewer unwanted by-products.

It is an object of the present invention to disclose an improved process for manufacture of fluoran leuco dyes containing a phenylenediamine moiety. The process of the invention has fewer side reactions, fewer by-products and higher yield.

SUMMARY OF THE INVENTION

Described is a process for the manufacture of a fluoran dye of the structure according to formula 1

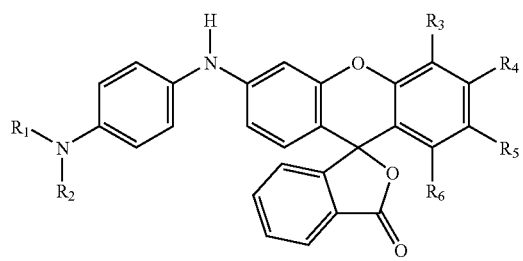
(1)

comprising condensing in an alkanesulfonic acid or arenesulfonic acid a keto acid according to formula 2

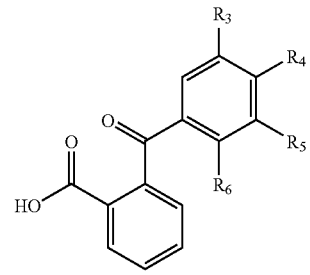
(2)

with an aminodiphenylamine of formula 3

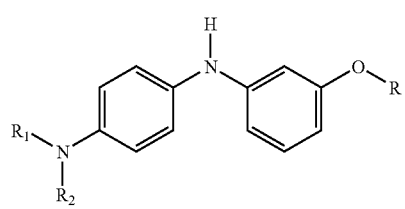
(3)

wherein R, $R_1$ and $R_2$ are each independently selected from alkyl($C_1$-$C_8$), aryl or aralkyl; wherein the aromatic ring in aryl or aralkyl may be unsubstituted or substituted with alkyl($C_1$-$C_8$), alkoxy($C_1$-$C_8$), or halogen; wherein $R_1$—N—$R_2$ may form pyrrolidinyl, piperidinyl and morpholinyl ring moieties $R_3$, $R_4$, $R_5$ and $R_6$ are each independently selected from hydrogen, alkyl, cycloalkyl, alkoxy, halogen, aryl or aralkyl. The aromatic ring in aryl or aralkyl may be unsubstituted or substituted with alkyl, alkoxy or halogen; said alkyl or alkoxy moieties being from one to eight carbons; or $R_3$ and $R_4$, or $R_4$ and $R_5$, or $R_5$ and $R_6$, may form alicyclic or aromatic ring structures.

The alkanesulfonic acid or arenesulfonic acid can be used neat. Dissolution of the keto acid in the alkanesulfonic acid or arenesulfonic acid can be accomplished by heating and stirring, preferably heating to about 30° C., more preferably to at least 35° C.

The product is condensed with an aminodiphenylamine of formula 3. This part of the reaction typically can be carried out at room temperature with stirring for a time and temperature sufficient to form the fluoran of formula 1.

The formed fluoran can be recovered and isolated by making the reaction mixture alkaline and extracting with a solvent, such as toluene.

DETAILED DESCRIPTION

The present invention is an improved process for manufacture of fluoran leuco dyes of formula 1 containing a phenylenediamine moiety. The process of the invention comprises reacting a keto acid of formula 2 with aminodiphenylamine of formula 3 in an alkanesulfonic acid such as methanesulfonic acid, ethane sulfonic acid or in an arenesulfonic acid such as benzenesulfonic acid, 1-napthalenesulfonic acid, or 2-naphthalenesulfonic acid. Methanesulfonic acid is preferred.

Alkanesulfonic acids or arenesulfonic acids may be liquids or low melting point solids. The solid forms can be liquefied with mild heating above the melting point of the material. The keto acid is then able to be more conveniently dissolved into the liquefied sulfonic acid.

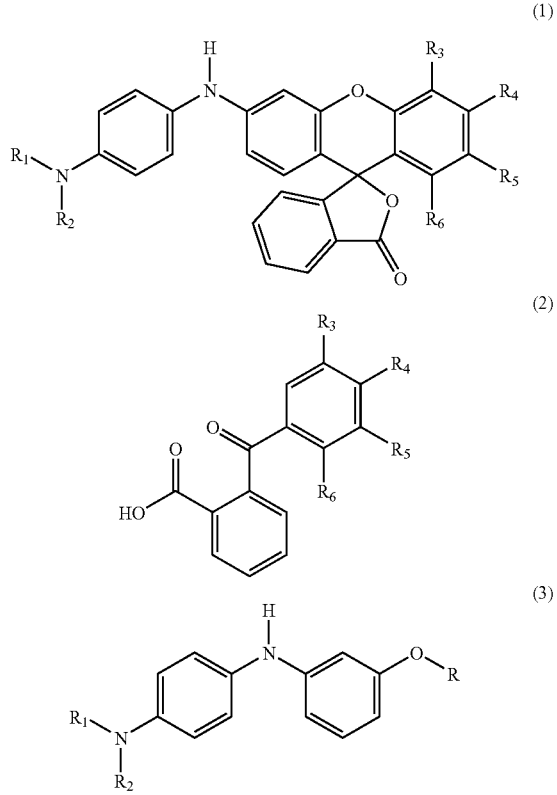

In formulas 1, 2 and 3, R, $R_1$ and $R_2$ may be the same or different and each represents alkyl($C_1$-$C_8$), aryl or aralkyl. Aromatic ring in aryl and aralkyl may be unsubstituted or substituted with alkyl, alkoxy or halogen; wherein $R_1$—N—$R_2$ may form pyrrolidinyl, piperidinyl and morpholinyl ring moieties.

$R_3$, $R_4$, $R_5$ and $R_6$ each independently represent hydrogen, alkyl($C_1$-$C_8$), cycloalkyl, alkoxy($C_1$-$C_8$), halogen, aryl or aralkyl. The aromatic ring in aryl and aralkyl may be unsubstituted or substituted with alkyl, alkoxy or halogen; said alkyl or alkoxy moieties being from one to eight carbons. Also, the pairs $R_3$ and $R_4$, $R_4$ and $R_5$, and $R_5$ and $R_6$ may form alicyclic or aromatic ring structures.

Preferably the alkanesulfonic acid is methanesulfonic acid. Methane sulfonic acid is typically available commercially as a colorless liquid. It is also available in anhydrous form.

The keto acid is first dissolved in the sulfonic acid such as methanesulfonic acid. Warming to about 30° C. and more preferably 35° C. aids dissolution. In one embodiment, preferably the keto acid is 2-(2-hydroxy-3,4-dimethyl benzoyl) benzoic acid. After dissolution of the keto acid in methanesulfonic acid, an aminodiphenylamine such as 3-methoxy-4'-dimethylaminodiphenylamine is added and the reaction mixture is stirred for a time and temperature, preferably room temperature overnight, to allow the reaction to proceed.

The reaction mixture is then made alkaline such as with a 10% solution of sodium hydroxide and extracted with solvent such as toluene. If desired, the fluoran can be further recrystallized from organic solvents such as isopropanol heated to an elevated temperature.

In general, the keto acid of formula 2, and more specifically of formula 7 can be used as a starting material (such as if purchased commercially) or can be prepared by reacting the corresponding substituted phenol, such as alkyl phenol, or more particularly for example, 3,4-dimethylphenol (formula 8) is reacted with phthalic anhydride (formula 9) in the presence of anhydrous aluminum chloride and 1,2-dichloroethane as solvent.

This preparation of the keto acid can be illustrated as:

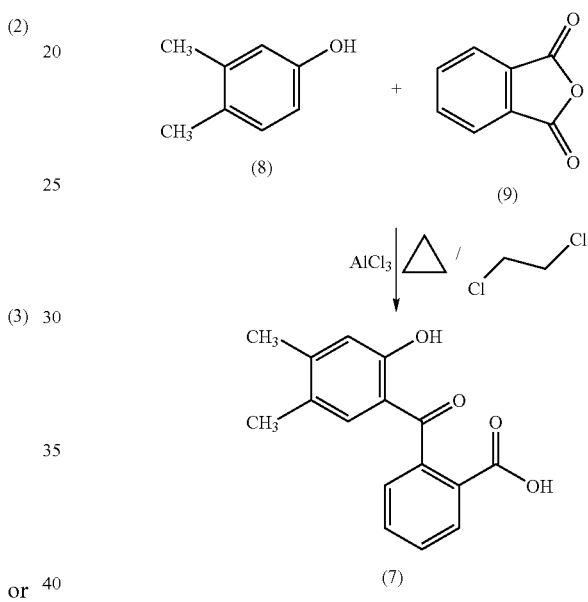

The keto acid (formula 7) should be free of unreacted phenol (formula 8), so it is important to drive the formation of the keto acid to completion or to remove unreacted phenol to isolate the pure keto acid. It is usually more convenient to drive the reaction to completion by allowing sufficient time for reaction completion. In the presence of strong acid, unreacted phenol if present gives rise to formation of a competing fluoran (formula 10) as a side reaction and impurity.

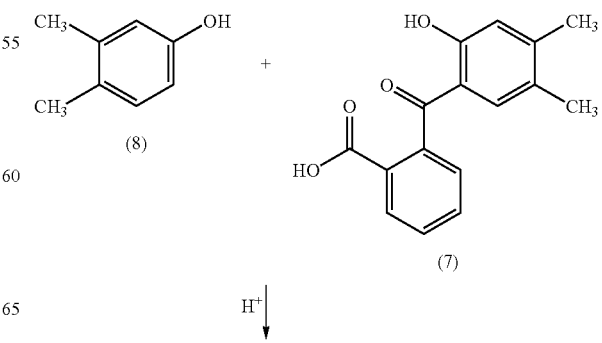

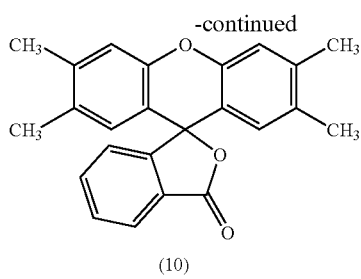

(10)

EXAMPLE 1 (COMPARATIVE)

Preparation of 2',3'-Dimethyl-6'-[4-Dimethylaminophenyl] amino-spiro[isobenzofuran-1(3H),9'-[9H]xanthene]-3-one (formula 6) in sulfuric acid

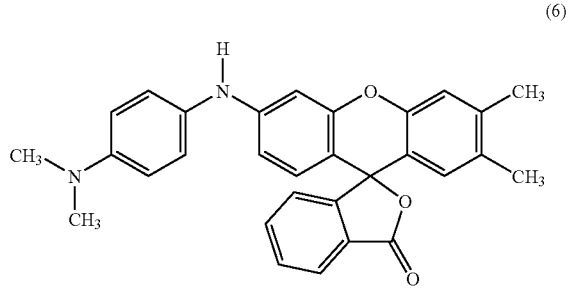

(6)

2-(2-hydroxy-3,4-dimethylbenzoyl)benzoic acid (2.7 g, 0.01 mole) was added to sulfuric acid (15 ml) in a three-necked, 250 ml round-bottom flask, equipped with a mechanical stirrer and reflux condenser carrying a drying tube. The contents of the flask were warmed to 35° C. with stirring until all the acid had dissolved. Then, 3-methoxy-4'-dimethylaminodiphenylamine (2.4 g, 0.01 mole) was added and the reaction mixture was stirred overnight at room temperature. The reaction mixture was poured on to ice/water and made alkaline with sodium hydroxide (10%); toluene (50 ml) was added and the reaction mixture was kept at 85°-90° C. for two hours with vigorous stirring. The warm toluene layer was separated, washed with hot water, dried and filtered hot. On cooling, the product separated as grayish white solid. This solid was purified by recrystallization from hot isopropanol. A white solid was obtained. Yield: 2.0 g (43%). M.P.: 185°-187° C. IR (KBr) N—H band at 3258 cm$^{-1}$ and C=O band at 1758 cm$^{-1}$.

EXAMPLE 2

Preparation of 2',3'-dimethyl-6'-[4-dimethylaminophenyl] amino-spiro[isobenzofuran-1(3H), 9'-[9H]xanthene]-3-one (formula 6) in methanesulfonic acid.

2-(2-hydroxy-3,4-dimethylbenzoyl)benzoic acid (2.7 g, 0.01 mole) was added to methanesulfonic acid (15 ml) in a three-necked, 250 ml round-bottom flask, equipped with a mechanical stirrer and reflux condenser carrying a drying tube. The contents of the flask were warmed to 35° C. with stirring until all the acid had dissolved. Then 3-methoxy-4'-dimethylaminodiphenylamine (2.4 g, 0.01 mole) was added and the reaction mixture was stirred overnight at room temperature. The reaction mixture was poured on to ice/water and made alkaline with sodium hydroxide (10%); toluene (50 ml) was added and the reaction mixture was kept at 85°-90° C. for two hours with vigorous stirring. The warm toluene layer was separated, washed with hot water, dried and filtered hot. On cooling, the product separated as greyish white solid. This solid was purified by recrystallization from hot isopropanol. A white solid was obtained. Yield: 3.7 g (80%) M.P.: 185°-187° C. IR (KBr) N—H band at 3258 cm$^{-1}$ and C=O band at 1758 cm$^{-1}$.

Unless otherwise indicated, all measurements herein are by weight and in the metric system.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes can be made by those skilled in the art without departing from the spirit and scope of the invention.

What is claimed is:

1. A process for the manufacture of a fluoran dye of the structure according to formula 1

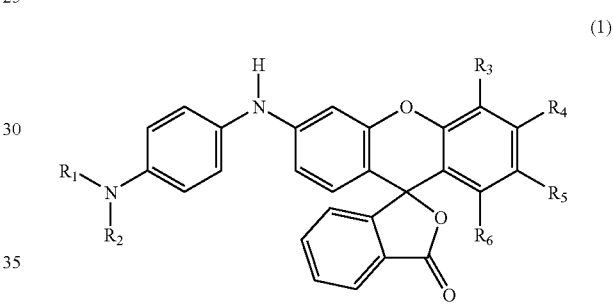

(1)

comprising condensing in an alkanesulfonic acid or in an arenesulfonic acid a keto acid according to formula 2

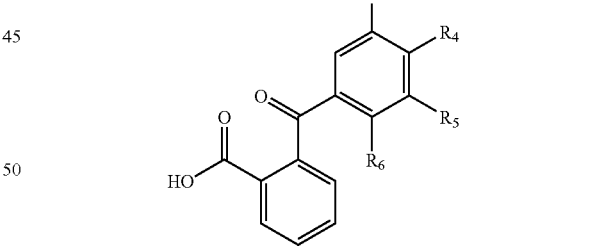

(2)

with an aminodiphenylamine of formula 3

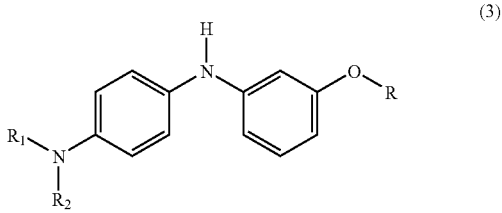

(3)

wherein R, $R_1$ and $R_2$ are each independently selected from alkyl($C_1$-$C_8$), aryl or aralkyl; wherein the aromatic ring in aryl or aralkyl may be unsubstituted or substituted with alkyl($C_1$-$C_8$), alkoxy($C_1$-$C_8$), or halogen; wherein $R_1$—N—$R_2$ may form pyrrolidinyl, piperidinyl or morpholinyl ring moieties;

wherein $R_3$, $R_4$, $R_5$ and $R_6$ are each independently selected from hydrogen, alkyl, cycloalkyl, alkoxy, halogen, aryl or aralkyl; wherein the aromatic ring in aryl or aralkyl may be unsubstituted or substituted with alkyl, alkoxy or halogen; the alkyl or alkoxy moieties herein being from one to eight carbons; or $R_3$ and $R_4$, or $R_4$ and $R_5$, or $R_5$ and $R_6$, may form alicyclic or aromatic ring structures.

2. The process according to claim 1 wherein the keto acid is first dissolved in methanesulfonic acid.

3. The process according to claim 2 wherein dissolution is accomplished by heating to at least 30° C.

4. The process according to claim 2 wherein after dissolving the keto acid, the aminodiphenylamine is added with stirring and the reaction mixture is reacted for a time and temperature sufficient to form the fluoran of formula 1.

5. The process according to claim 4 wherein the mixture is made alkaline and the formed fluoran recovered by extraction with a solvent.

6. The process according to claim 5 wherein the solvent is toluene.

7. The process according to claim 1 wherein the alkanesulfonic acid is selected from methanesulfonic acid or ethanesulfonic acid.

8. The process according to claim 1 wherein the arenesulfonic acid is selected from benzenesulfonic acid, 1-napthalenesulfonic acid, or 2-naphthalenesulfonic acid.

9. The process according to claim 1 wherein the aminodiphenylamine is 3-methoxy-4'-dimethylaminodiphenylamine.

* * * * *